WRITING DEVICE

Original Filed Nov. 6, 1962

Marcel Joseph Von Arx,
Inventor

By Wenderoth, Lind and Ponack, attorneys

WRITING DEVICE

Original Filed Nov. 6, 1962

Marcel Joseph Von Arx,
Inventor

By Wenderoth, Lind and
Ponack, Attorneys

United States Patent Office

Re. 26,583
Reissued May 27, 1969

26,583
WRITING DEVICE

Marcel Joseph von Arx, Montgeron, France, assignor to Rotary Pen Corp., Kenilworth, N.J., a corporation of New Jersey Original No. 3,262,427, dated July 26, 1966, Ser. No. 497,594, Oct. 6, 1965, which is a continuation of application Ser. No. 235,763, Nov. 6, 1962. Application for reissue Nov. 2, 1967, Ser. No. 684,892
Claims priority, application France, Nov. 9, 1961, 878,435; Dec. 22, 1961, 882,949
Int. Cl. B43k *27/12*
U.S. Cl. 401—31 5 Claims

Matter enclosed in heavy brackets [ ] appears in the original patent but forms no part of this reissue specification; matter printed in italics indicates the additions made by reissue.

This application is a continuation of copending application Serial No. 235,763, filed November 6, 1962, and entitled "Ball Point Pens," and now abandoned.

The present invention relates to writing devices and particularly to ball point pens of the multiple writing unit type. Such pens are primarily used with writing units charged with ink of different colors to give a quick color-change in use but they may also be used with units charged with the same ink so that when one unit is exhausted, another can be brought quickly into operation.

In accordance with the present invention there is provided a ball point pen of the multiple writing unit type and having for each writing unit a pusher which is spring-biased from an engaged operative position towards the retracted position, in which pen each pusher is provided with a ramp adapted, when the pusher is advanced while another pusher is engaged, to disengage the other pusher and thereby cause it to be spring driven to its retracted position.

In the operation of the pen each pusher is engaged when the point of its writing unit projects in the writing position at the end of the pen and is released for return to its retracted position when another pusher is moved from its own retracted position. Further movement of the other pusher brings the new ball point into the writing position.

In one preferred form of the pen each pusher consists of a head part upon which the ramp is formed and a rod part which passes through a helical spring which provides the spring bias for the pusher. Conveniently a guide member for the pusher is mounted on the axis of the pen and provides an abutment for restraining the pushers in the engaged position. Advantageously the guide member is grooved or slotted to accommodate the ramps as the pushers are advanced.

Instead of arranging the writing unit so that the ramp of one pusher bears directly on the other pusher to disengage it, there may be provided, in accordance with another preferred form of the invention, a transversely displaceable ball mounted between the pushers, which ball serves to convey the disengaging reaction of the ramps from one pusher to the other. Conveniently, the pushers are formed with recesses which are penetrated by the ball when the pushers are in the retracted position, said recesses being bounded by the ramps.

Figure 1:
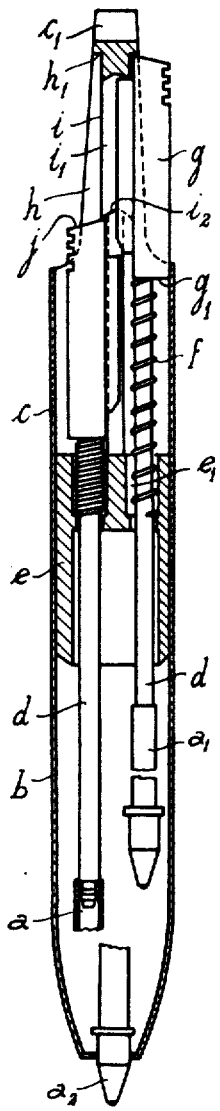
Figure 2:
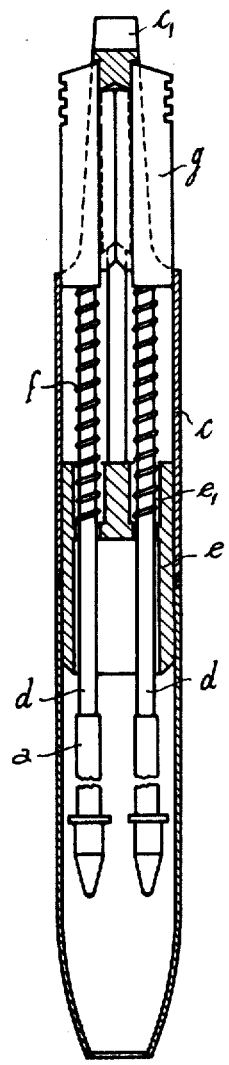
Figure 3:
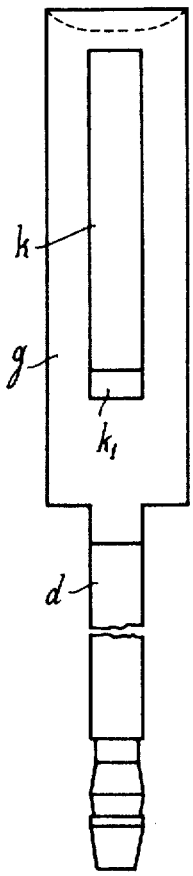
Figure 4:
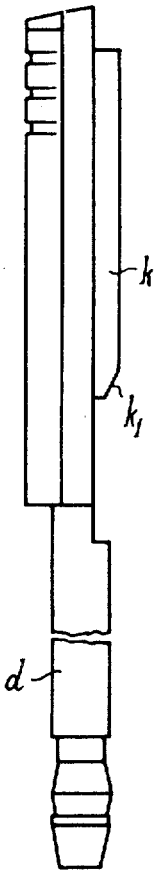

Other features and advantages will become apparent from the following description of preferred embodiments of the invention; other embodiments, proportions and the like may be used without departing from the spirit and scope of the invention. In the accompanying drawings:

FIG. 1 is a part-sectional elevation of a first embodiment designed for two writing units with one ball point in the writing position and the other retracted, FIG. 2 is a view similar to FIG. 1 with both ball points retracted, FIGS. 3 and 4 are elevations on an enlarged scale of one of the pushers used in the embodiment shown in FIGS. 1 and 2, and FIGS. 5 and 6 are part-sectional elevations of a second embodiment designed for two writing units.

In all the figures, the same reference numerals signify corresponding parts.

Each unit it fitted to the rod part d of a pusher, slidably carried in a fixed guide plug e, formed with internally shouldered channels $e_1$ and fixed, for example, to the body of the pen. Threaded over each rod part is a spring f which bears against the base $g_1$ of a pusher head g and against the shoulders of the channels $e_1$, by means of which the pushers slide in the ring e.

Two cavities h, machined or moulded in the upper part of the cap c, are adapted to receive the heads g of the pushers which abut in the retracted position against the shoulder $h_1$. These heads move along a median partition i having a central slot $i_1$. The lower part of this partition forms a stop for the forward portion j of the heads.

The heads g of the pushers d present (FIGS. 3 and 4) on their inner faces a projection k, the end of which is inclined to provide a ramp $k_1$.

The operation is as follows:

Downward pressure exerted on the head of the pusher corresponding with the selected color is transmitted both vertically to push the ball point forward, and transversely to the axis of the pen so that the top j of the head of the pusher engages under the partition i.

In order to retract the ball point corresponding with the engaged pusher, the spring of which is now compressed, it is necessary only to exert a light pressure on the head of the other pusher. The ramp thereof which rests against the upper part of the projection of the head, engaged under the partition i, pushes outwardly against said upper part and disengages it. The writing unit returns to the retracted position under the action of the spring f until the head of its pusher engages the upper part of the cap $e_1$, the projection k sliding in the slot $i_1$ of the partition i.

Continued pressure on the head of the pusher for the selected color results in locking the new ball point in the writing position.

It will be noted that the small number and simplicity of the components of the pen are conducive to manufacture at unusually low cost.

Figure 5:
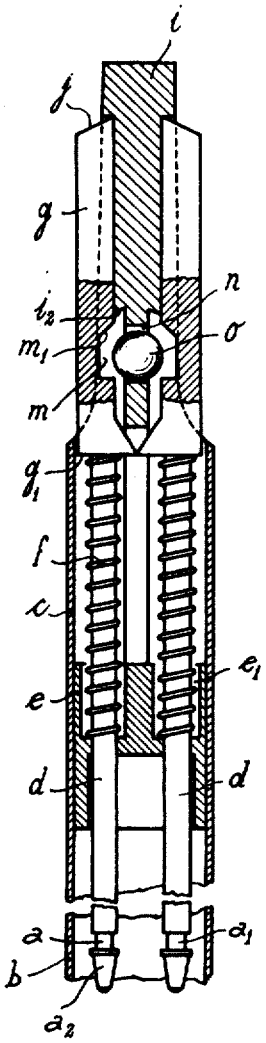
Figure 6:
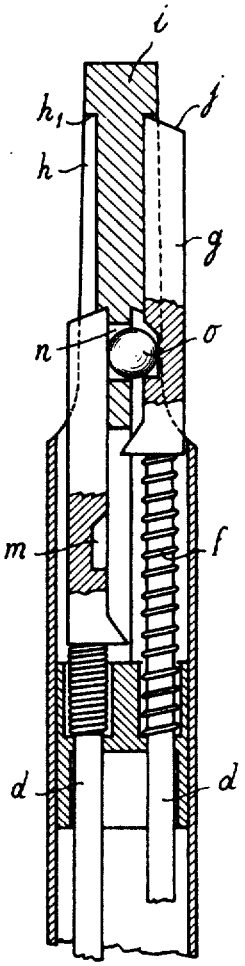

In the embodiments of FIGS. 5 and 6, the head g has a recess m, bounded by a ramp portion $m_1$.

An aperture n is formed centrally through the forward part of the partition i of the cap of the pen at the retracted level of the notches m of the heads g. In the aperture n is held a ball o which, as may be seen from FIGS. 5 and 6, is displaceable transversely to the axis of the pen.

The equally simple operation is as follows:

When a pressure is applied to the head g of the pusher, this head displaces the ball o and engages in the operative position. The ball is received in the recess m of the other pusher (FIG. 6). In order to release the engaged pusher and return it under the action of its return spring, it is necessary only to operate the other pusher. Under the action of the ramp $m_1$ of the notch m of the said other pusher, the ball is forced transversely to disengage the head of the engaged pusher and cause its release. Further movement of the head of the pusher corresponding with the new color locks the ball point therefor in the writing position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A ball point pen comprising a casing; a plurality of writing units separately movable between a writing position and a retracted position in said casing; a guide plug fixed in said casing; a pusher rod for each unit mounted slidably for movement along the longitudinal axis of said casing in said casing guided by said guide plug; a pusher head cooperating with each pusher rod slidably mounted in said casing; a spring biasing each pusher rod to the retracted position located between said guide plug and its corresponding pusher head; an axially directed abutment on each pusher head; an axially directed abutment on said casing positioned between said pusher heads and engageable by said abutments of said pusher heads when in the writing position of said units restraining them against a retraction by said springs; and a substantially radially directed disengagement ramp on each pusher head cooperating directly with an integral portion of a pusher head of a unit in writing position on manual movement of a pusher head from the retracted position to move the pusher head of the unit in writing position radially clear of said abutment on said casing and thereby cause a spring-biased retraction thereof.

2. A writing device comprising a casing; a plurality of elongated writing units; said writing units being mounted in said casing for aixal movement along the axis of said casing and being separately movable between a writing position and a retracted position in said casing; spring means biasing each writing unit to its retracted position in said casing; abutment means fixed longitudinally relative to said casing positioned between said writing units; locking means on each of said writing units engageable by said abutment means when said writing units are moved into their writing positions for restraining said units against retraction by said spring means; and camming means integrally formed on each writing unit; the camming means of one of said writing units cooperating directly with an integral portion of another of said writing units when said other writing unit is in its writing position upon movement of said one writing unit from its retracted position toward its writing position to move the locking means of said other writing unit clear of said abutment means so as to cause a spring-biased retraction of said other writing unit to its retracted position.

3. A writing device comprising a casing; a plurality of writing units; said writing units being mounted in said casing for axial movement along the axis of said casing and being separately movable between a writing position and a retracted position in said casing; spring means biasing each writing unit to its retracted position in said casing; abutment means fixed relative to said casing and positioned between said writing units; locking means on each of said writing units engageable by said abutment means when said writing units are moved into their writing positions for restraining said units against retraction by said spring means; and camming means comprising a substantially radially directed disengagement ramp integrally formed on each writing unit; the disengagement ramp of one of said writing units cooperating directly with an integral portion of another of said writing units when said other writing unit is in its writing positon upon movement of said one writing unit from its retracted position toward its writing position to move the locking means of said other writing unit clear of said abutment means so as to cause a spring-biased movement of said other writing unit to its retracted position.

4. A writing device comprising a casing; a plurality of writing units; said writing units being mounted in said casing for axial movement along the axis of said casing and being separately movable between a writing position and a retracted position in said casing; spring means biasing each writing unit to its retracted position in said casing; abutment means fixed relative to said casing and positioned between said writing units; locking means on each of said writing units engageable by said abutment means when said writing units are moved into their writing positions for restraining said units against retraction by said spring means; each of said writing units having a substantially radially directed projection integrally formed thereon; each of said projections having a cam surface; the cam surface of one of said writing units cooperating directly with an integral portion of the projection of another of said writing units when said other writing unit is in its writing position upon movement of said one writing unit toward its writing position to move the locking means of said other writing unit clear of said abutment means so as to cause a spring-biased movement of said other writing unit to its retracted position.

5. A writing device comprising a casing; a plurality of writing units; said writing units being mounted in said casing for axial movement along the axis of said casing and being separately movable between a writing position and a retracted position in said casing; spring means biasing each writing unit to its retracted position in said casing; abutment means fixed relative to said casing and positioned between said writing units; locking means on each of said writing units engageable by said abutment means when said writing units are moved into their writing positions for restraining said units against retraction by said spring means; each of said writing units have a substantially radially directed projection integrally formed thereon; said projection being elongated in the direction of the axis of said casing; each of said projections having a cam surface near its end which is closest to the writing end of the writing unit on which it is formed; the cam surface of one of said writing units cooperating directly with an integral portion of the projection of another of said writing units when said other writing unit is in its writing position upon movement of said one writing unit toward its writing position to move the locking means of said other writing unit clear of said abutment means so as to cause a spring-biased movement of said other writing unit to its retracted position; said integral portion of the projection of said other of said writing units being located near the end of said last-mentioned projection which is opposite the cam surface of said last-mentioned projection.

References Cited

The following references, cited by the Examiner, are of record in the patented file of this patent or the original patent.

FOREIGN PATENTS

| | | |
|---|---|---|
| 217,896 | 3/1961 | Austria. |
| 1,249,835 | 11/1960 | France. |
| 915,905 | 7/1954 | Germany. |

LAWRENCE CHARLES, *Primary Examiner.*